United States Patent Office.

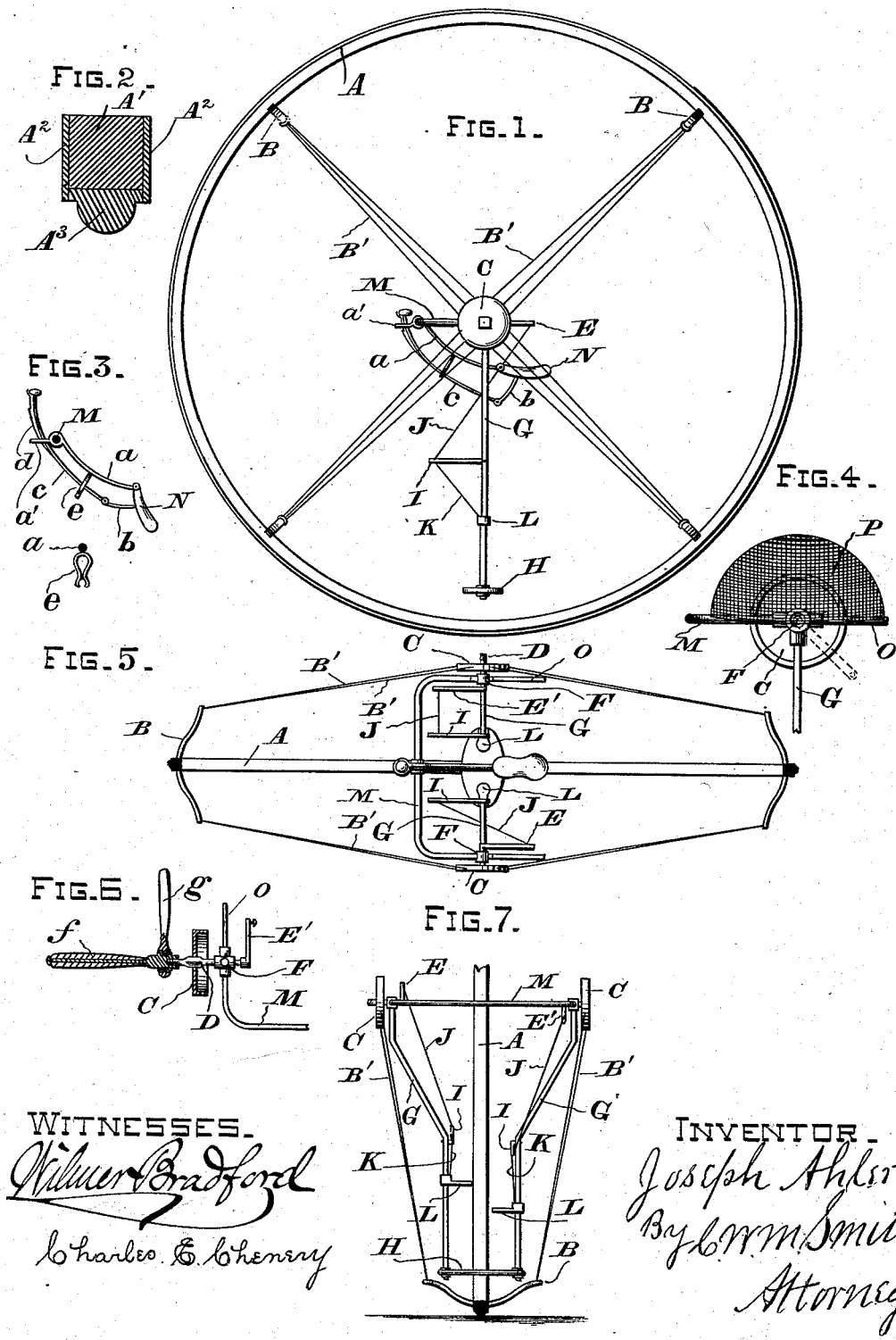

JOSEPH AHLERT, OF SAN FRANCISCO, CALIFORNIA.

VELOCIPEDE.

SPECIFICATION forming part of Letters Patent No. 258,207, dated May 23, 1882.

Application filed February 16, 1882. (No model.)

*To all whom it may concern:*

Be it known that I, JOSEPH AHLERT, a citizen of the United States, and residing at San Francisco, in the county of San Francisco and State of California, have invented certain new and useful Improvements in Velocipedes, of which the following is a specification.

My invention relates to certain new and useful improvements in single-wheel velocipedes or monocycles; and the objects of my improvements are, first, to provide a single-wheel velocipede or monocycle in which the rider occupies a saddle or seat placed within the circumference of the wheel and below the center or axial line thereof; second, to provide a monocycle in which motion is imparted to the carrying-wheel by means of crank-shafts, vibrating lever-arms, and stirrups or foot-rests moved in an alternate reciprocating manner; third, to provide a new and improved arrangement of the supporting bars and rods of the saddle or seat; fourth, to provide a device whereby the velocipede may be sustained and supported in an upright position when being rolled from place to place by the operator when walking alongside of the device, and also to other details of construction, which will be hereinafter more fully described. I accomplish these objects by the mechanism illustrated in the drawings hereunto annexed, in which—

Figure 1 is a side elevation, showing the principal working parts of my velocipede. Fig. 2 is a cross-section through the felly and tire of the wheel. Fig. 3 is a side view of the saddle and its supporting-rods. Fig. 4 is a side view of the shield or screen over the crank-shafts. Fig. 5 is a horizontal sectional view of the velocipede. Fig. 6 is a sectional plan view of the device for holding and guiding the velocipede while the operator walks beside it. Fig. 7 is a vertical sectional view of the lower half of the wheel, showing the foot-rest and driving mechanism.

Similar letters of reference are used to designate like parts throughout the several views.

Let A represent the wheel, which may be formed in the usual manner; but I prefer to construct it in the manner shown in Fig. 2—that is to say:

The felly $A'$ is constructed of wood, and bound upon both sides with a circular band of steel, $A^2$, which projects slightly beyond the tread of the felly, so as to form bearings to sustain the rubber tire $A^3$.

At four different points upon the inner edge of the rim, and equidistant from each other, I attach the transversely-projecting bows or rods B, to the outer ends of which are attached the stay-rods $B'$. The ends of these stay-rods are screw-threaded and provided with nuts and washers, whereby the tension of the same may be regulated. The stay-rods $B'$ are extended inwardly in diverging lines from their point of attachment to each end of the rim or tire bows; yet each series of stay-rods upon each side of the wheel converges toward a central point, and is attached to the flanged disks or hubs C C, keyed or otherwise rigidly connected to the divided axle D, the inner ends of which are provided with the cranks E $E'$, bent in opposite directions to each other.

Upon the short axles D D, between the disks C C and crank-arms E $E'$, are loosely journaled the boxes F F, which should be provided with oil-cups for lubricating purposes. To the lower side of these boxes are attached the downwardly-projecting rods G G, connected together at their lower ends by the foot-board H, as shown in Fig. 7. About midway of the length of these rods are pivoted the oscillating lever-arms I I, the outer ends of which are connected by the rods J J to the cranks E $E'$, and by the rods K K to the pedals or stirrups L L, which slide up and down upon the vertical portion of the rods G G.

To the front side of the boxes the hand-rod M is connected, upon which is rigidly attached the rod $a$, projecting downwardly and backwardly, and has pivoted to its rear end the saddle N. To the under side of the saddle is attached the downwardly-projecting rod $b$, connected by a pivot-joint with the rod $c$, provided with a spring-catch, $d$, said rod and spring-catch passing through and engaging with an aperture made in the lip $a'$, formed on the rod $a$. Projecting outwardly from the rod $a$ is a doubled spring-clasp, $e$.

To the rear side of the boxes F F are attached the short horizontal rods O O, which are somewhat longer than the crank-arms E $E'$. These rods are used to support the rear portion of a shield of metal or of wire-gauze, P, (seen in Fig. 4,) the front portion of which is supported by the hand-rod M. This shield is sufficiently large to permit of the free revolution of the crank-arms within and beneath it, and prevents the arm of the rider from being accidentally struck by said cranks when revolving.

One of the short axles or crank-shafts D is projected outwardly beyond the face of the disk C, and has turned upon it a left-hand screw-thread, on which is screwed the roller-handle *f*. The inner end of said handle is provided with an annular recess, or with flanges which hold in place the loosely-journaled transverse handle *g*, all of which is clearly illustrated in Fig. 6.

When the operator wishes to move his machine without riding it he screws the handle to its place, preferably upon the right hand side of the machine. Then, by grasping the axial or roller handle *f* in his right hand and pressing forward, the wheel is caused to roll over the surface of the ground, it being steadied and kept in an upright position by means of the backwardly-projecting handle *g*, which is grasped in the left hand.

When not in use the saddle is lowered to the position shown in Fig. 3, (in order that it may not be in the way of the rider when starting the velocipede,) and is held in that position by the spring-loop *e*.

The operation of my improved velocipede will be as follows, to wit: The rider starts the velocipede in the usual manner and steps quickly upon the foot-board H, at the same time grasping the knob on the top of rod *c*, forcing it downward through the opening in the lip *a'*, and throwing the saddle N up between his legs, in which position it is held by the spring-catch *d*. The rider then seats himself astride the saddle, and, placing his feet upon the foot-rests, stirrups, or pedals L L, presses them down in an alternate reciprocating manner. As the stirrups slide up and down upon the vertical rods G G they produce, through the medium of the connecting-rods K K, a vibrating movement of the pivoted lever-arms I I, which in turn produce, by means of the connecting-rods J J, a rotary movement of the crank-arms connected thereto by suitable wrist-pins; and thus the rider, by alternately raising and lowering his feet, communicates a uniform rotary motion to the wheel, and is easily and rapidly carried over the surface of the ground.

The rods connected to the crank-arms and vibrating levers are made adjustable in length, so as to vary the stroke and adjust the distance of the stirrups from the saddle to suit the length of limb of the rider.

It may perhaps be unnecessary to remark that the wheel is guided in its forward motion by the movement of the body of the rider, who directs its course by swaying his weight to one side or the other.

Having thus described my invention, what I claim, and desire to secure by Letters Patent, is—

1. In a monocycle, the combination of the following elements, to wit: the driving-wheel A, having a divided axle provided with internal crank-arms operated by stirrups or pedals sliding upon suitable guides, and connecting-rods and vibrating lever-arms, and the seat or saddle supported by said divided axle, constructed, arranged, and operating substantially as described, for the purpose specified.

2. In a velocipede, the axle D of the main driving-wheel, provided with a left-hand screw-thread, in combination with the auxiliary steering or propelling roller-handle *f* and sustaining or balancing handle *g*, loosely journaled upon said handle *f*, when constructed and arranged to operate substantially in the manner and for the purpose specified.

3. In a velocipede, the hinged saddle N, pivoted to the rod *a*, rigidly attached to the rest or hand-rod M, and provided with a forwardly-projecting perforated lip, *a'*, rods *b* and *c*, catch-spring *d*, and spring-loop *e*, constructed, arranged, and operating substantially as described.

4. In a monocycle, the combination of the rim A, rim-bows B, stay-rods B', hubs or disks C C, divided axle D, having crank-arms E E', oscillating lever-arms I I, pedals or stirrups L L, and the connecting-rods J J K K, downwardly-projected rods or guides G G, foot-board H, and hand-rod M, carrying the saddle N, constructed, arranged, and operating substantially as described, for the purpose specified.

In testimony that I claim the foregoing I have hereunto set my hand and seal this 28th day of January, 1882.

JOSEPH AHLERT. [L. S.]

Witnesses:
C. W. M. SMITH,
CHAS. E. KELLY.